United States Patent [19]

Chiu

[11] 4,171,381

[45] Oct. 16, 1979

[54] SMOKE COLORED FOOD CASING AND METHOD OF PRODUCING SAME BY USE OF A MAILLARD REACTION PRODUCT AND AN ALBUMIN

[75] Inventor: Herman S. Chiu, Chicago, Ill.

[73] Assignee: Union Carbide Corporation, New York, N.Y.

[21] Appl. No.: 872,769

[22] Filed: Jan. 27, 1978

[51] Int. Cl.$^2$ ............................................. A22C 13/00
[52] U.S. Cl. ................................ 426/105; 138/118.1; 426/129; 426/135; 426/140
[58] Field of Search ............... 426/105, 135, 129, 140; 138/118.1

[56] References Cited

U.S. PATENT DOCUMENTS

| | | | |
|---|---|---|---|
| 2,346,417 | 4/1944 | Cornwell et al. | 426/135 X |
| 3,151,990 | 10/1964 | McKnight | 426/140 X |
| 3,360,383 | 12/1967 | Rose et al. | 426/135 |
| 3,533,808 | 10/1970 | Cameron et al. | 426/135 |
| 3,943,262 | 3/1976 | Winkler | 426/140 X |

OTHER PUBLICATIONS

Science of Meat and Meat Products, Price et al., 2nd Ed., 1960 W. H. Freeman & Co., pp. 460-461.
Caramel-Part I The Browning Reactions, Greenshields et al., Process Biochemistry, Dec. 1972, pp. 11-16.
J. Agr. Food Chem., vol. 22, No. 5, 1974, pp. 796-800, Wolfrom et al.

*Primary Examiner*—Robert L. Lindsay, Jr.
*Attorney, Agent, or Firm*—Fred Ian Nathanson

[57] ABSTRACT

A tubular food casing is treated with an admixture of an albumin and a Maillard reaction product of an amino acid and a reducing sugar to provide a casing that is suitable to impart a smear resistant brown smoke color coating to food products processed therein. Alternatively, a casing is treated first with an albumin and then with a Maillard reaction product.

36 Claims, No Drawings

SMOKE COLORED FOOD CASING AND METHOD OF PRODUCING SAME BY USE OF A MAILLARD REACTION PRODUCT AND AN ALBUMIN

This invention relates to methods of treating a food casing and also relates to the resultant improved treated casing, which is suitable to impart a smear resistant smoke color to food products processed therein.

In particular this invention relates to a method of coating a fibrous or non-fibrous regenerated cellulose tubular food casing and the resultant casing, which method encompasses coating the internal surface of the casing with an admixture of egg albumin and a reaction product of an amino acid and a reducing sugar, to provide a casing which is suitable to impart a smear resistant smoke color to food products processed therein.

An alternative embodiment of the invention is to first coat the internal surface of the casing with egg albumin and then coat the internal surface of the casing with a reaction product of an amino acid and a reducing sugar, to provide a casing which is suitable to impart a smear resistant smoke color to food products processed therein.

This invention also relates to collagen casing treated by the methods of this invention.

Tubular food casings are used extensively for processing a great variety of meat products and other food items. The food casings are generally thin-walled tubing of various diameters prepared by methods well known in the art from reconstituted materials, and particularly cellulose derivatives such as regenerated cellulose. Cellulosic food casings may also be prepared with fibrous webs embedded in the wall thereof, such casings commonly being referred to as "fibrous food casings." Edible food casings may be prepared from collagen and are known as "collagen casing." Typical processes for the production of collagen casing are disclosed in U.S. Pat. No. 3,551,535 issued Dec. 29, 1970 and U.S. Pat. No. 3,782,977 issued Jan. 1, 1974 each to W. E. Henderson, et al and U.S. Pat. No. 3,956,512 issued May 11, 1976 to T. E. Higgins.

The many different recipes and modes of processing that are used by the processed food industry to suit different tastes and even regional preferences generally necessitates the use of food casings with a variety of characteristics. In some instances, for example, food casings are required to have multi-functional uses wherein they serve as containers during the processing of a food product encased therein and then also serve as a protective wrapping for the finished product. In the processed meat industry, however, the food casings, especially those derived from cellulose, used in the preparation of many types of meat products, such as various types of sausages, beef rolls, hams and the like, are frequently removed from about the processed meat product prior to slicing and/or final packaging.

Surface appearance is an important factor in the commercial and consumer acceptance of most processed meat products and a common feature of most varieties of such products involves the use of "smoking" for imparting a characteristic brown color thereto. In the past, the smoking of food products was generally accomplished by the food processors subjecting the food product to actual contact with smoke in a gaseous or cloud-like form. Such smoking processes, however, have been considered unsatisfactory for a variety of reasons including the inefficiencies and lack of uniformity of the smoking operation. Because of the shortcomings experienced, the trend has been to employ various types of liquid aqueous solutions of smoke commonly called "liquid smoke solutions" that have been developed and used commercially by the food processor in the processing of many types of meat and other food products.

The application of liquid smoke solutions to meat products is generally carried out in a variety of ways, including spraying or dipping an encased food product during the processing thereof or by incorporating the liquid smoke solution in the recipe itself. The actual operation of smoking by spraying or dipping is not completely satisfactory due to the equipment expenses and the limited degree of control that has been found, and incorporation of liquid smoke solutions in the meat recipe does not always provide the desired surface appearance because of dilution of smoke ingredients.

It has also been suggested, as for example in U.S. Pat. No. 3,330,669 to Hollenbeck, that application of a viscous liquid smoke solution to the inside surface of a tubular food casing by the food processor immediately prior to the stuffing thereof with a sausage emulsion results in preparation of processed food products that exhibit good color after cooking and removal of the casing.

Heretofore, however, it has been found that providing casings to afford special treatment or structural characteristics to the food product can be more uniformly and economically accomplished by the casing manufacturer. This is especially true with the advent and wide commercial use of automatic stuffing and processing equipment in the processed food industry.

Several methods of providing food casings with coatings applied to a surface thereof are known and described in the patent literature. There is disclosed, for example, in U.S. Pat. No. 3,451,827 a spraying method for applying a variety of coating materials over the internal surface of small diameter casing and in U.S. Pat. No. 3,378,379 to Shiner, et al, a "slugging" method used for applying coating materials to the internal surface of large diameter casings. While such techniques and others have been used in preparing commercial quantities of coated food casings, the casings prepared thereby are, in general, used to meet particular commercial requirements and to the best of our knowledge none of the coated casings disclosed in the art are satisfactory for imparting smear resistant smoke color or specifically intended to impart smear resistant smoke color to a meat product processed therein. In U.S. Pat. Nos. 3,360,383 to Rose, et al, and 3,383,223 and 3,617,312 to Rose, for example, are disclosed coating compositions, that employ liquid smoke solutions in amounts that are specifically required to react with and insolubilize a protein material, such as gelatin, which are used to prepare casings that meet special adhesion properties required for use in the processing of dry sausages, which properties would therefore limit the suitability thereof for other casing applications.

Preparation of tubular food casings that could be used in the manufacture of a variety of processed food products and that would impart a smear resistant smoke color to the processed product would be highly desirable. Especially advantageous would be food casings that could be prepared using conventional coating methods and that would impart a desired smear resistant color to products that have the casing removed prior to final packaging or cooking or that are sold with the casing still in place.

Brown dyes, such as chocolate Brown HT, have been considered for casing treatment, but such dye is not considered safe for human consumption. A smoke color dye mixture, such as Stange's smoke color, can be used to give a superficial smoke color to meat products, but, because it is a dye mixture of primary red and blue dyes, which have differing solubility and diffusivity, the surface coloration of the meat products becomes bluish as the red dye diffuses into the meat product with storage. Thus, the unstable Stanget's smoke color is not a satisfactory coloring agent.

In our co-pending application Ser. No. 810,843, filed June 28, 1977, it is disclosed that a Maillard reaction product of a reducing sugar and an amino acid can be used to treat food casings such as a cellulosic food casing to impart a smoky brown color to the casing which can subsequently transfer to the surface of an encased meat product processed therein. Even though such treatment does result in good color transfer, the color on the meat surface may rub off. Therefore it is desired to provide a treated food casing which can impart a smear resistant smoke color coating to the surface of a meat product processed in the treated casings.

It has been found that the use of egg albumin and a Maillard reaction product of the reaction of a reducing sugar with an amino acid for casing treatment provides a smear resistant smoky brown color coating on the surface of a meat product processed in the treated casing.

The deficiencies of the prior art smoke coloring agents and the invention disclosed in our copending application have been overcome by the present invention, which provides a treated casing, which is capable of providing a non-toxic, safe and stable smear resistant smoke color to the surface of a meat product processed in the treated casing.

The undesirable browning of foodstuffs, such as orange juice, due to the Maillard reaction between reducing sugars and amino acids is known and is discussed by Wolfrom, et al, in "J. Agr. Food Chem.", Vol. 22, No. 5, 1974 at pages 796–800. Also see Greenshields, et al, in "Process Biochemistry", December 1972, pp. 11–16. In "The Science of Meat and Meat Products," J. F. Price, et al, eds.; 2nd ed.; 1971, at pages 460–461, it is disclosed that reducing sugars cause rapid darkening of bacon on frying, which is ascribed to the Maillard reaction between glucose and amino groups. Neither Wolfrom, et al, nor Greenshields, et al, nor Price, et al, disclose the use of the Maillard reaction to color food casing or meat products encased in the treated casings.

Egg albumin has been used in the past to treat food casings, but to our knowledge the prior art does not disclose its use in combination with a Maillard reaction product to treat casing in order to provide a smear resistant smoke brown color to a meat product processed in the treated casing. H. J. Rose, et al in U.S. Pat. Nos. 3,360,383 and 3,427,169 coat a casing used in the preparation of dry sausages with egg albumin insolubilized by liquid smoke, in order to provide a cellulosic casing which adheres to a dry sausage emulsion and follows the shrinkage of the sausage during curing and drying. M. N. O'Brien in U.S. Pat. No. 3,645,760 cross-links egg albumin with liquid smoke to provide a coating for the fibrous reinforcing material used in fibrous cellulose casing. Neither Rose, et al nor O'Brien disclose the use of egg albumin to provide smear resistance to a Maillard reaction product.

In accordance with the present invention there is provided a tubular food casing that is suitable to impart smear resistant smoke color to the surface of food products processed therein comprising a tubular cellulosic food casing having coated on an internal surface thereof an admixture of egg albumin and a Maillard reaction product of an amino acid and a reducing sugar in amounts specified in more detail hereinafter. In an alternate embodiment of the present invention the casing has a coating on an internal surface thereof, of a first layer of egg albumin and a second layer of a Maillard reaction product, in amounts specified in more detail hereinafter.

It has been discovered that the tubular food casings of the present invention may be used to impart smear resistant smoke color to a wide variety of meat products processed therein without the need for any further smoking operations by the food processor. Moreover, it has been found that said casings may be prepared in the form of shirred casing sticks wherein long continuous lengths of tubular food casing are pleated and compressed into a substantially shortened form thereof, or as short segments of flattened tubing.

Also provided in accordance with the present invention is a collagen casing treated by the methods of this invention. Smoke colored collagen casings of this invention are capable of imparting smear resistant smoke color to food products, such as meat products, processed therein. This is particularly applicable to inedible collagen casings because these casings are removed from the food product. However, in the practical use of edible collagen casing, once the food product is encased therein, the casing is not removed before human consumption, but is consumed with the encased meat product. Therefore, transfer of the smoke color from an edible collagen casing to an encased food product surface is not critical, because in normal use, unlike in the use of peelable cellulose casings, the consumer will not see the encased food product's actual surface.

Also provided in accordance with the present invention are methods of preparing tubular food casings that are suitable for imparting smear resistant smoke color to food products processed therein which comprises in one embodiment, hereinafter referred to as the "one step method," providing a tubular food casing and applying to an internal surface thereof an admixture of egg albumin and a Maillard reaction product of a reducing sugar and an amino acid, in amounts specified in more detail hereinafter. In an alternate embodiment of the present invention, hereinafter referred to as the "two step method", the casing is coated on its internal surface with a first layer of egg albumin and then with a second layer of a Maillard reaction product, in amounts specified in more detail hereinafter.

The terms "a reaction product" and "Maillard reaction product" as used herein are intended to encompass any and all reaction products which are formed from the Maillard reaction, including any reducing sugar or amino acid in stoichiometric excess but excluding any water or citrate compounds hereinafter described.

The food casings of the present invention may be prepared from tubular casings having varied compositions, such as those well-known in the art as regenerated cellulose casings either with or without fibrous reinforcement. The former is known in the trade as fibrous casing and is reinforced with paper and the like. Other casings can be treated by the methods of this invention, such as those made from cellulose derivatives, collagen (edible and inedible), alginates, amylose, insolubilized polyvinyl alcohol (both fibrous reinforced and unreinforced) and the like.

While the invention particularly relates to tubular food casings, food wrapping materials in other forms such as sheet form may be provided by appropriate modifications of the treating methods of this invention by those skilled in the art.

The casings of this invention can be used to process meat products including, but not limited to, cooked, smoked, dry or semidry sausages such as frankfurters, bolognas, salamis, cervelats, Thuringers, and the like. Cheese products may also be encased in the casings of this invention.

In a preferred embodiment of this invention involving the use of an admixture of egg albumin and a Maillard reaction product to coat casing, specific details of which are set forth hereinafter, an aqueous solution of at least one amino acid and at least one reducing sugar is first formed. Optionally added to this solution is a citrate compound to increase the reaction rate between the amino acid and reducing sugar. The solution is then heated to react the amino acid and the reducing sugar to form a Maillard reaction product, then further heated to evaporate the water content to desired levels and, if needed, re-diluted with water to adjust color concentration. It is then admixed with an aqueous egg albumin solution. The resultant egg albumin and Maillard reaction product admixture is then optionally mixed with antiblock agents before the casing is coated. The admixture is coated on the internal surface of a tubular food casing giving the casing a smoky brown color. The smoke colored casing can then be stuffed with a food product such as a meat emulsion. The smoky brown color of the casing will transfer to the surface of the encased meat product, so that if the casing is separated from the encased meat after cooking or after other further processing well-known in the art, the surface of the meat will have a smear resistant smoky brown color.

Egg albumin as found in various forms is suitable for use in this invention including egg albumin as present in egg white, egg yolk, whole egg, and the like. Also suitable in place of egg albumin or in admixture therewith are serum albumin, lactalbumin, and the like.

The preferred embodiments of this invention encompass the use of egg albumin as found in egg white, such as the well-known commercially available Kraft's dried egg white powder.

Many amino compounds are suitable for preparing a Maillard reaction product for use in the present invention. Exemplary of the amino acids which can be employed are 4-aminobutyric acid, glycine, alanine, arginine, and the dimers and the trimers thereof, and the like. Also useful are amino acid derivatives such as salts of amino acids like monosodium glutamate and lysine monohydrochloride. Other amino acids or derivatives not specified herein, may be selected for use by those skilled in the art. The amino acids or derivatives may be used individually, or as mixtures of various amino acids, or as mixtures of amino acid derivatives, or as mixtures of amino acids and amino acid derivatives. Protein hydrolysates are also useful.

Exemplary of the reducing sugars which are suitable for preparing a Maillard reaction product for use in the present invention are xylose, arabinose, dextrose (d-glucose), and the like. The invention is not limited to those reducing sugars specified herein, but may include others selected by those skilled in the art. The reducing sugars may be used individually or as mixtures of various reducing sugars.

If an admixture of a Maillard reaction product and egg albumin is used to coat the casing, then the amount of the coating applied should be formed about 9 to about 50 mg/sq. in. of casing wall, and preferably from about 10 to about 20 mgs/sq. in., depending on whether antiblock agents are employed. Correspondingly, the amount of Maillard reaction product applied is from about 2.7 to about 14.0 mg/sq. in. of casing wall, and preferably from about 3.5 to about 7.0 mg/sq. in., while the amount of egg albumin applied is from about 2.0 to about 20.0 mg/sq. in. of casing wall, and preferably from about 3.0 to about 10.0 mg/sq. in.

The treated casing is subsequently stuffed with a meat product such as a frankfurter emulsion which is then further processed therein by well-known conventional methods. Smoke color transfers from the treated casing to the surface of the encased meat product and is rendered smear resistant by egg albumin also transferring to the surface of the meat product from the casing.

The treated casing produced by the one step or two step methods of this invention should have coated on an internal surface thereof, a Maillard reaction product of an amino acid and a reducing sugar at a level of from about 2.7 to about 14.0 milligrams of reaction product per square inch of casing wall, and preferably from about 3.5 to about 7.0 mg per sq. in., in order to impart the smoke color to a food product encased therein, and egg albumin at a level of from about 2.0 to about 20.0 milligrams per square inch of casing wall, and preferably from about 3.0 to about 10.0 mg. per sq. in., in order to impart smear resistance to the smoke color transferred to the surface of the encased food product.

The preferred level of Maillard reaction product in the casing which ultimately is transferred to the surface of the encased meat product during the processing thereof, is dependent upon individual color preferences of the consumers. Some would prefer a dark brown sausage while others a light brown sausage.

The method of applying the treating agents to the casing can be selected from various known techniques such as slugging, which is also known as bubble coating (U.S. Pat. No. 3,378,379 to Shiner, et al and U.S. Pat. Nos. 3,360,383 to Rose, et al; U.S. Pat. No. 3,383,223 to Rose; and U.S. Pat. No. 3,427,169 to Rose, et al), spraying (U.S. Pat. No. 3,330,669 to Hollenbeck), and internally coating the casing while shirring by the method disclosed by Bridgeford in U.S. No. Re. 28,281.

The slugging method for coating the inside of a casing involves filling a portion of the casing with the coating material, so that the slug of coating material generally resides at the bottom of a "U" shape formed by the casing draped over two parallel rollers, and then moving the continuous indefinite length of casing so that the slug of coating material remains confined within the casing, while the casing moves past the slug and is coated on its inside wall by the coating material contained within the slug.

The tubular casing is preferably coated on its internal surface, but can be coated on its outer surface, if it is then turned inside out before stuffing with a meat product.

The admixture of a Maillard reaction product and egg albumin used to coat casings is prepared by first preparing an aqueous solution of an amino acid and a reducing sugar in a molar ratio of the reducing sugar to the amino acid of from about, 10 to 1, to about, 1 to 10, and preferably from about, 1 to 1, to about, 1 to 5. The amount of water used in the preparation of the amino acid-reducing sugar solution should be that amount which is sufficient to dissolve all the components of the solution, that is from about 40.0 to about 70.0 weight percent water based upon the total weight of the final solution, and preferably from about 40.0 to about 50.0 weight percent water. The solution is then heated to a temperature in the range of from about 60° C. to about 100° C. for about 5 minutes to about 30 minutes to cause the Maillard reaction to take place, preferably from about 90° C. to about 100° C. for about 10 to about 20 minutes, and then additionally heated for a sufficient amount of time to evaporate the water to bring the moisture down to from about 5 to about 10 weight percent water. The Maillard reaction product containing composition is then re-diluted with water, to a water content of from about 25 to about 50 weight percent, and preferably from about 30 to about 35 weight percent, before it is admixed with an egg albumin solution. An aqueous solution of egg albumin is formed containing from about 25.0 to about 45.0 weight percent egg albumin, and preferably from about 35.0 to about 40.0 weight percent egg albumin, which is then admixed with the Maillard reaction product composition in a proportion such that the weight ratio of Maillard reaction product to egg albumin in the coating admixture is from about, 1 to 4.2, to about, 4 to 1, and preferably is from about, 1 to 2, to about 1 to 1.

Potassium or sodium citrate as the hydrate thereof, may be optionally added to the aqueous solution of the amino acid and the reducing sugar in order to increase the rate of reaction between the amino acid and the reducing sugar. If used, the amount of potassium or sodium citrate added in hydrate form is expressed as a molar ratio of the potassium or sodium citrate to reducing sugar used and is on the order of from about, 0 to 1, to about, 1 to 1.

Optionally, prior to coating the casing, antiblock agents are added to the admixture of a Maillard reaction product and egg albumin, as described above. Antiblock agents are added to prevent the treated casing from sticking to itself. Any compatible antiblock agent can be employed such as a water emulsion of food grade mineral oil, vegetable oil, silicone oil, and the like. If an antiblock agent emulsion is employed, the final mixture containing the admixture of a Maillard reaction product and egg albumin is an emulsion with the Maillard reaction product and egg albumin dissolved in the water phase. In the practice of this invention the difference between a solution and an emulsion is not critical. The amount of antiblock agents employed in the coating admixture is dependent upon the type of reagents. Preferably from about 5 to about 15 weight percent antiblock agent is used.

For additional viscosity control, compatible diluents such as glycerin and the like may optionally be added to the admixture of egg albumin and a Maillard reaction product prior to the coating step.

In the well-known conventional methods for preparing regenerated cellulose casing (non-fibrous or fibrous casing) or collagen casing, the final casing processing step is a drying step which encompasses passing the unfinished casing, commonly known as "gel casing", through a hot air dryer wherein the gel casing is dried to a desired moisture level. Coating of the casing with an admixture of a Maillard reaction product and egg albumin is preferably performed on finished casing, rather than gel casing. Some additional drying of the casing after coating may be necessary depending on the water content of the Maillard reaction product and egg albumin coating. This additional drying can be performed at from about 70° C. for about 5 minutes to about 100° C. for about 1 minute, and preferably from about 80° C. to about 90° C. for about 3 to about 2 minutes.

A Maillard reaction product and egg albumin admixture may also be used in conjunction with liquid smoke, which is well known in the art as a smoke coloring and flavoring agent for meat products, to coat the internal surface of food casings.

Suitable coating compositions may also contain those ingredients that are known in the art as useful for imparting a variety of desirable characteristics to food casings, such as improved shirrability, peelability, pliability and the like.

The following examples are set forth as being merely illustrative of the invention and are not intended, in any manner, to be limitative thereof. Unless otherwise indicated, all parts and percentages are by weight.

EXAMPLE I

This example illustrates the treatment of a cellulosic casing with an admixture of a Maillard reaction product and egg albumin, which provides a casing suitable for imparting smear resistant smoke color to the surface of a food product processed therein.

The following stock materials are prepared using simple mixing:

| (A) | Egg Albumin Solution: | |
| | Kraft dried egg white | 400 grams |
| | Water | 600 grams |
| | Total | 1000 grams |
| (B) | Mineral Oil Emulsion: | |
| | Mineral Oil | 500 grams |
| | TWEEN 80 emulsifier | 30 grams |
| | Water | 500 grams |
| | Total | 1030 grams |
| (C) | Maillard Reagent Solution | |
| | 4-aminobutyric acid | 10 grams |
| | Dextrose | 20 grams |
| | Sodium citrate hydrate | 5 grams |
| | Water | 75 grams |
| | Total | 110 grams |

The 110 gram Maillard reagent stock solution is heated to 90° C. and maintained at that temperature for 10 minutes to cause the Maillard reaction to take place. The solution is then further heated to evaporate the water leaving a dark brown paste weighing 45 grams which contains a Maillard reaction product.

A coating admixture is then prepared by mixing together 5 grams of the paste, 10 grams of the egg albumin stock solution, and 2 grams of the stock mineral oil emulsion.

The coating admixture is then uniformly applied to the internal surface of a tubular cellulosic casing by the slugging method, at a level of 12 milligrams of total admixture per square inch of casing wall, which corresponds to 3.5 milligrams of Maillard reaction product per square inch and 2.8 milligrams of egg albumin per square inch of casing wall. The treated casing has a rich smoky brown color.

EXAMPLE II

This example illustrates that the casings of this invention impart smear resistant smoke color to the surface of a meat product processed therein.

The smoke colored cellulosic casing prepared as in Example I, is stuffed with frankfurter emulsion.

The frankfurter is processed at 25% relative humidity with a dry bulb temperature maintained at 140° F. for 30 minutes. The temperature is then raised from 140° to 180° F. over a period of 30 minutes, and then maintained at 180° F. until an internal frankfurter product temperature of 160° F. is reached. The product is then cold tap-water showered to an internal temperature of 120° F. and is held in a 40° F. cooler overnight prior to peeling. The casing is then peeled from the finished frankfurter revealing a frankfurter with a smear resistant smoke brown color on its surface. A control sample stuffed in a casing not treated with egg albumin, but with a Maillard reaction product solution only, does not have the smear resistant smoke color.

EXAMPLE III

This example illustrates the treatment of a cellulosic casing with egg albumin and then with a Maillard reaction product in a two step method, which provides a casing suitable for imparting smear resistant smoke color to the surface of a food product processed therein.

A coating admixture containing a Maillard reaction product is prepared by admixing 10 grams of the dark brown paste of Example I, 10 grams of water, and 2 grams of the stock mineral oil emulsion of Example I.

The stock egg albumin solution of Example I is uniformly applied as a first layer of coating to the internal surface of a tubular cellulosic casing by the slugging method, at a level of 10 milligrams of egg albumin solution per square inch of casing wall, which corresponds to 4 milligrams of egg albumin per square inch of casing wall.

The coating admixture containing a Maillard reaction product as prepared above is then uniformly applied as a second layer of coating to the internal surface of the tubular cellulosic casing by the slugging method, at a level of 10 mg/sq.in. of casing wall, which corresponds to about 4.5 milligrams of Maillard reaction product per square inch of casing wall. The treated casing has a rich smoky brown color.

EXAMPLE IV

This example illustrates that the casings of this invention prepared by the two step method impart smear resistant smoke color to the surface of a meat product processed therein.

The smoke colored cellulosic casing prepared as in Example III, is stuffed with frankfurter emulsion and processed as in Example II. The casing is then peeled from the finished frankfurter revealing a frankfurter with a smear resistant smoke brown color on its surface. A control sample stuffed in a casing not treated with egg albumin, but with a Maillard reaction product solution only, does not have the smear resistant smoke color.

Although the present invention has been described and set forth in some detail, it should be further understood that the same is susceptible of changes, modifications and variations without departing from the scope and spirit of the invention.

What is claimed is:

1. A food casing comprising a casing having a coating over a surface thereof, said coating comprising an albumin and a product from the reaction of a reducing sugar with an amino compound selected from the group consisting of an amino acid, an amino acid derivative, and a mixture thereof, said coated casing being suitable for stuffing with a food product and suitable for imparting a smear resistant smoke color to the surface of a food product processed therein.
2. The casing of claim 1 wherein said casing is a tubular food casing.
3. The casing of claim 2 wherein said surface is an internal surface of said casing.
4. The casing of claim 3 wherein the casing is a collagen casing.
5. The casing of claim 3 wherein the casing is a cellulosic casing.
6. The casing of claim 3 wherein said albumin is an egg albumin.
7. The casing of claim 3 wherein said albumin is present in an amount of from about 2.0 to about 20.0 mgs. per square inch of casing internal surface.
8. The casing of claim 3 wherein said reaction product is present in an amount of from about 2.7 to about 14.0 mgs. per square inch of casing internal surface.
9. The casing of claim 8 wherein said albumin is an albumin present in an amount of from about 2.0 is about 20.0 mgs. per square inch of casing internal surface.
10. The casing of claim 9 wherein said coating comprises an admixture of an egg albumin and said reaction product.
11. The casing of claim 9 wherein said coating comprises a first layer of an egg albumin and a second layer of said reaction product.
12. The casing of claim 9 wherein said amino compound is selected from the group consisting of 4-aminobutyric acid, glycine, lysine monohydrochloride, alanine, arginine, and monosodium glutamate.
13. The casing of claim 9 wherein said reducing sugar is selected from the group consisting of xylose, arabinose and dextrose.
14. The casing of claim 9 wherein said coating additionally comprises a liquid smoke.
15. The casing of claim 9 wherein said coating additionally comprises a citrate selected from the group consisting of potassium citrate and sodium citrate.
16. The casing of claim 9 wherein said coating additionally comprises an antiblock agent.
17. The casing of claim 9 wherein a food product is encased therein.
18. In a method for manufacturing a food casing, the improvement which comprises coating a surface of a casing with an albumin and a product from the reaction of a reducing sugar with an amino compound selected from the group consisting of an amino acid, an amino acid derivative, and a mixture thereof, said coated casing being suitable for stuffing with a food product and suitable for imparting a smear resistant smoke color to the surface of a food product processed therein.
19. The method of claim 18 wherein said casing is a tubular food casing.
20. The method of claim 19 wherein said surface is an internal surface of said casing.
21. The method of claim 20 wherein the casing is a collagen casing.
22. The method of claim 20 wherein the casing is a cellulosic casing.

23. The method of claim 20 wherein said albumin is an egg albumin.

24. The method of claim 20 wherein said albumin is coated on said surface of said casing in an amount of from about 2.0 to about 20.0 mgs. per square inch of casing surface.

25. The method of claim 20 wherein the casing is coated by slugging.

26. The method of claim 20 wherein the casing is coated by spraying.

27. The method of claim 20 wherein said reaction product is coated on said surface of said casing in an amount of from about 2.7 to about 14.0 mgs. per square inch of casing surface.

28. The method of claim 27 wherein said albumin is coated on said surface of said casing in an amount of from about 2.0 to about 20.0 mgs. per square inch of casing surface.

29. The method of claim 28 wherein said albumin is an egg albumin.

30. The method of claim 29 wherein said egg albumin and said reaction product are coated on said surface of said casing in the form of an admixture comprising said egg albumin and said reaction product.

31. The method of claim 29 wherein said egg albumin is coated in a first layer on said surface of said casing and then said reaction product is coated in a second layer on said surface of said casing coating with said first layer.

32. The method of claim 29 wherein said amino compound is selected from the group consisting of 4-aminobutyric acid, glycine, lysine monohydrochloride, alanine, arginine, and monosodium glutamate.

33. The method of claim 29 wherein said reducing sugar is selected from the group consisting of xylose, arabinose and dextrose.

34. The method of claim 29 wherein a liquid smoke is additionally coated on said surface of said casing.

35. The method of claim 29 wherein an antiblock agent is additionally coated on said surface of said casing.

36. A coating composition comprising an admixture of egg albumin and a product from the reaction of a reducing sugar with an amino compound selected from the group consisting of an amino acid, an amino acid derivative, and a mixture thereof, said composition being suitable as a coating on a food casing, said coated casing being suitable for stuffing with a food product and suitable for imparting a smear resistant smoke color to the surface of a food product processed therein.

* * * * *